Feb. 23, 1960     C. M. BLACKBURN ET AL     2,925,722
EXPENDABLE LIQUID EVAPORATIVE COOLANT SYSTEM
Filed May 7, 1958     3 Sheets-Sheet 1
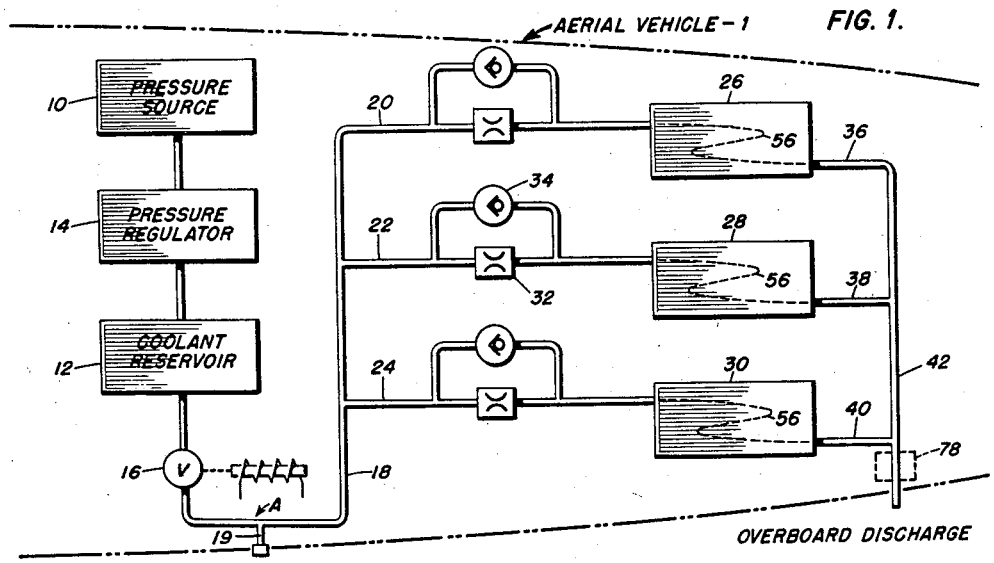
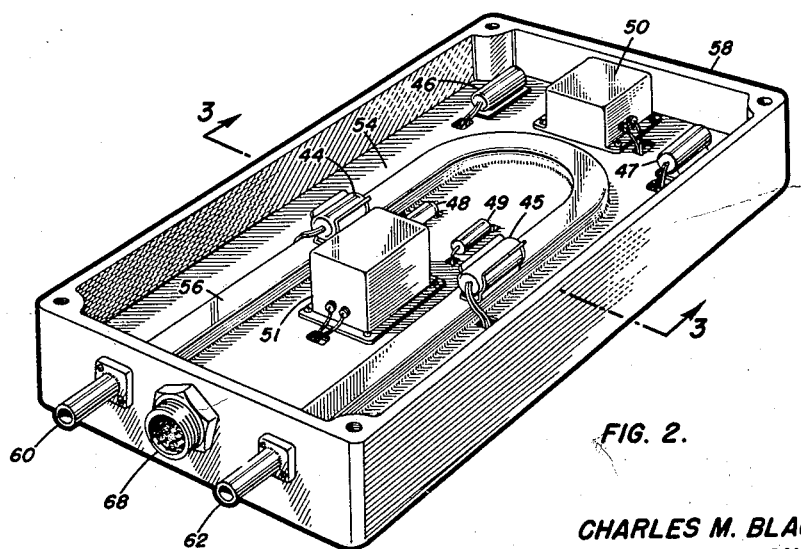
CHARLES M. BLACKBURN
WALTER W. HAGNER
      INVENTORS
BY
      ATTORNEYS

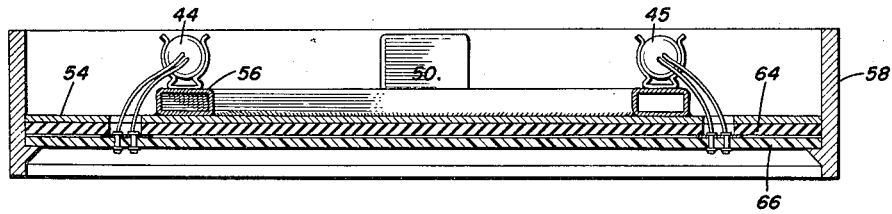
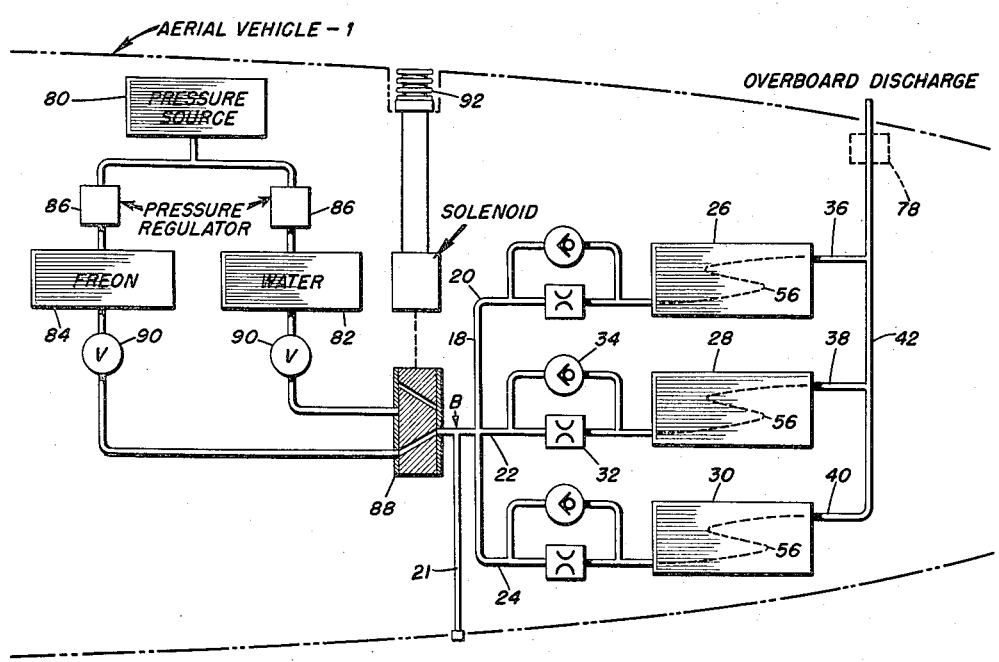

United States Patent Office 2,925,722
Patented Feb. 23, 1960

2,925,722

EXPENDABLE LIQUID EVAPORATIVE COOLANT SYSTEM

Charles M. Blackburn and Walter W. Hagner, Silver Spring, Md., assignors to the United States of America as represented by the Secretary of the Navy Application May 7, 1958, Serial No. 733,775

18 Claims. (Cl. 62—175)

This invention relates to cooling systems for electronic equipment, and more particularly to an expendable liquid evaporative cooling system for cooling electronic equipment in high altitude aerial vehicles.

It is becoming necessary in an ever increasing number of situations to provide a receiver for the heat generated within and around electronic equipment. This is especially true in cases of high performance manned aircraft, and the unmanned aerial vehicle which must operate for extended periods of time. The problem in general terms, is one of collecting, transferring, and dissipating the generated heat at a rate which is sufficient to prevent any electronic component from experiencing a detrimental temperature rise. Many solutions to this problem exist in the art, but the systems embodied therein are generally not suitable for use in aerial vehicles when considered in the light of certain factors such as effectiveness, weight and space limitations, dependability, etc.

It is therefore an object of the present invention to provide an effective high altitude cooling system for electronic equipment in an aerial vehicle.

A further object of the invention is to provide an airborne cooling system that is comparatively light and compact.

An additional object of the invention is to provide an airborne cooling system that is dependable and simple.

Other objects and many of the attendant advantages of the invention will be readily appreciated as the same becomes understood by reference to the following detailed description when considered in connection with the accompanying drawings, wherein:

Fig. 1 is a schematic diagram of the cooling system constituting the present invention;

Fig. 2 is a perspective view of a chassis assembly utilized in the invention;

Fig. 3 is a section on line 3—3 of Fig. 2;

Fig. 4 is a schematic diagram of a modification of applicants' invention; and

Figure 5:
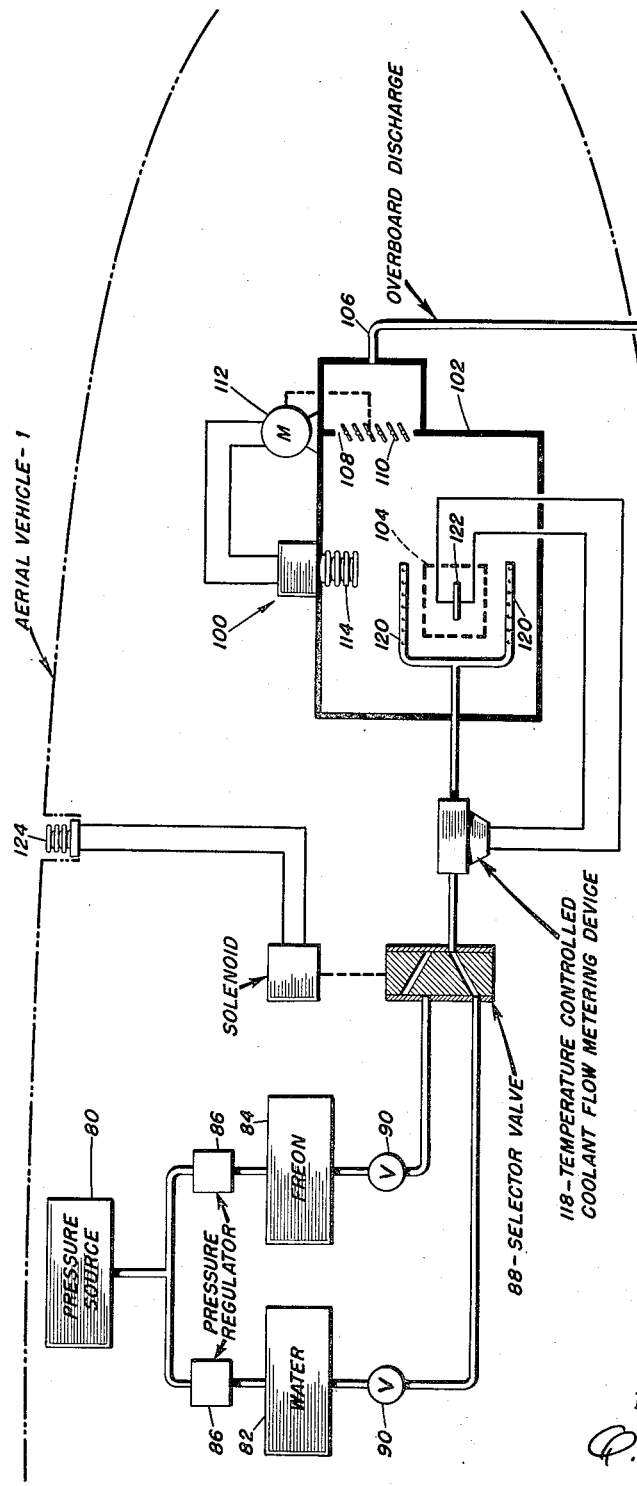
Fig. 5 is a schematic diagram of a second modification of applicants' invention.

Briefly, the present invention contemplates a cooling system for a high altitude aerial vehicle wherein an expendable liquid, such as water, is circulated through a cored chassis on which electronic equipment is mounted, and then vented to ambient pressure. As the vehicle gains altitude the boiling point of the liquid is lowered due to decreased atmospheric pressures at the higher altitudes. When sufficient altitude is gained that the heat from the electronic equipment causes boiling, approximately 1000 B.t.u. will be drawn off the total heat load produced by the equipment for every pound of water so vaporized, since the latent heat of vaporization for water is approximately 1000 B.t.u./lb. As long as sufficient altitude is maintained to promote such boiling at lowered temperatures, effective cooling of the cored chassis and the electronic components mounted thereon is accomplished.

Referring now to the drawings in greater detail, Fig. 1 shows applicants' invention employed within an aerial vehicle 1 and having a pressure source 10, such as a tank of pressurized nitrogen, connected to a coolant reservoir 12 through a pressure regulator 14. The coolant is selected from the standpoint of suitability with regard to the altitude expected to be attained, the heat load encountered, etc., giving consideration to such factors as the latent heat of vaporization, vaporization temperature, cost and weight of the coolant. Water has been found to be an economical and effective evaporative coolant, and its use will be herein discussed, although it is evident that other evaporants may be so utilized. Connected to the coolant reservoir 12 through a solenoid actuated valve 16 is a header 18, and extending from the header in parallel fashion are supply lines 20, 22, and 24 which furnish coolant to be circulated through chassis assemblies 26, 28, and 30, respectively. In each of the lines 20, 22, and 24 is a fixed throttling orifice 32 and in parallel with each orifice is a spring loaded bypass valve 34.

After the coolant has circulated through the chassis assemblies 26, 28, and 30, it is conveyed through outlet lines 36, 38, and 40, respectively, to a collector 42 and then discharged overboard into the atmosphere. It is obvious that although three chassis assemblies are shown here in Fig. 1, any number of such assemblies may be employed, within the scope of this invention.

The chassis assemblies 26, 28, and 30 carry the components of the various electronic systems of the aerial vehicle. As best seen in Fig. 2, each chassis comprises a flat deck 54 with a coolant passage 56 formed therein. The deck 54 is mounted within a frame 58 and inlet and outlet connections 60 and 62, respectively, are provided on the frame to supply and carry away the coolant. For the purpose of this application, the applicants have deemed it necessary to show only a few of the electronic components that can normally be mounted on an area such as the surface of deck 54. It is obvious that the entire surface of the deck 54 could be utilized, leaving room only, of course, for necessary wires and connections. Thermionic tubes such as those shown at 44, 45, 46, and 47 are mounted in clips that are attached to the deck 54 by means of an epoxy resin adhesive containing an aluminum colloid which enhances the thermal transfer characteristics. Smaller components 48 and 49 are affixed directly to the deck by means of the same adhesive. The larger components 50 and 51 are mounted in brackets that are bolted or otherwise suitably secured to the deck 54.

High heat source components, such as tubes 44 and 45, are mounted directly over the coolant passage 56 in order to attain maximum cooling of these components. The other components may be located proportionately nearer to or farther from the coolant passage 56 depending on the amount of cooling desired.

As seen in Fig. 3, electrical connections are made from the electronic components through apertures in the deck 54 and an insulating layer 64 to a printed circuit board 66. From the board 66 connections are made to an electrical connector 68, shown in Fig. 2, on the frame 58.

As previously mentioned, water was found to be an extremely satisfactory coolant for applicants' system because of its low cost, its convenient boiling temperature and its high latent heat of vaporization. While the boiling point of water at sea level is 212° F., it decreases linearly with respect to increases in altitude, so that at 100,000 feet the boiling point is approximately 41° F. Thus if the vehicle 1 is sustaining flight at 100,000 feet altitude, the water in the coolant passage 56 is boiling at 41° F. since the heat from the electronic components is sufficient to promote such boiling; and while the boiling is taking place, heat is drawn off the electronic components and transferred to the coolant at a rate of approximately 1000 B.t.u. per pound of coolant, that figure being the latent heat of vaporization per pound of water. The coolant, in its vaporized form, is then discharged overboard into the atmosphere.

Ground cooling, or cooling of the electronic components during a pre-launch warm-up period, may also be accomplished by introducing water at point A in Fig. 1 through a supply line 19 and from an external source. This water is caused to pass to the header 18 for distribution to the chassis assemblies 26, 28, and 30, the valves 34 permitting the water to bypass the throttling orifices 32. Since the operating range of presently available electronic components is in the neighborhood of 160° F., and since cooling is being accomplished at or near sea level, the boiling point of the water (approximately 212° F.) will be too high, so that advantage cannot be taken of the latent heat of vaporization. Instead, cooling is accomplished by transfer of sensible heat from the electronic components to the water; therefore, in order to maintain the 160° F. operating range, circulation of a sufficient quantity of water must be assured.

Test results of applicants' invention embodied in Fig. 1 indicate that in some instances in the altitude range of 0 to 38,000 feet the boiling point of water is not sufficiently low to provide adequate evaporative cooling to maintain the desired 160° F. operating temperature. To alleviate this, several modifications to applicants' invention may be made: (1) a coolant with a lower boiling point could be used, (2) liquid coolant should be circulated through the passages for cooling by transfer of sensible heat at the 0 to 38,000 feet range, or (3) a bi-coolant evaporative system could be employed. As shown in Fig. 4, this last named method utilizes water and an additional coolant that has a lower vaporization temperature than water such as Freon 11. Thus a pressure source 80 is connected between a water supply 82 and a Freon supply 84 through pressure regulators 86. The flow of either coolant is controlled by a solenoid actuated selector valve 88, with shut-off valves 90 positioned between each coolant supply and the valve 88. From the valve 88 the coolant is supplied to the chassis assemblies 26, 28, and 30, through the header 18 as was described previously in connection with Fig. 1. The valve 88, through a pressure sensing element 92 near the outer surface of the vehicle 1, responds to the ambient pressure and is calibrated such that when that pressure is greater than 3 p.s.i. (corresponding to an altitude below 38,000 feet), Freon is permitted to flow therethrough to the header 18. However, when that pressure falls below 3 p.s.i., or as the aerial vehicle ascends above 38,000 feet, the valve 88 switches the coolant flow from Freon to water. In this manner, at altitudes below 38,000 feet, Freon is used as the evaporant, and at greater altitudes, water is utilized, thus making it possible to take advantage of the low boiling point of Freon at the lower altitudes, and still permit beneficial use of water as an extremely effective and inexpensive evaporant with a latent heat of vaporization greater than that of Freon.

Ground cooling may also be accomplished, as previously discussed in connection with Fig. 1, in this system by introduction of Freon, water, or other coolant at point B through a supply line 21 and from an external source.

In the two embodiments of applicants' invention thus far discussed, i.e., Figs. 1 and 4, it will be seen that as the aerial vehicle 1 ascends into the higher altitudes, the electronic components will be cooled to an increasingly lower temperature, since the vaporization temperature of the coolant is decreasing. Although it is not expected that the lower temperature limit of the operating range of the electronic components will in this manner be attained, it may be deemed desirable in some instances to maintain a temperature to which the electronic components are cooled. This may be accomplished by providing a lower limit of pressure at which coolant vaporization can take place. As shown in Figs. 1 and 4, a back pressure regulator 78 may be installed in the exhaust collector 42 for the purpose of maintaining a predetermined minimum pressure in the coolant passages 56 to provide the desired control over the vaporization pressure. It is to be understood that the system is complete without the pressure regulator 78, and that this component may be added if minimum temperature control is desired.

Fig. 5 shows another method by which the minimum vaporization pressure is controlled, and although it is obvious that this embodiment would be impractical for missile use, the possibilities of some limited use merit its discussion here. The modification of Fig. 5 involves replacing the chassis assemblies of the previous embodiments by an evaporator arrangement 100. In this system, from the pressure source 80 to the selector valve 88, the arrangement is similar to that of Fig. 4 and its description need not be repeated.

The evaporator arrangement 100 comprises an evaporator 102 enclosing the electronic components as represented by a heat load 104. The evaporator 102 is substantially a closed chamber, being open only to ambient pressures at the discharge line 106 through an opening 108. For the purpose of controlling the pressure within the evaporator 102, movable louvers 110 are provided in the opening 108, movement of the louvers 110 being controlled by a motor 112 that responds to signals from a pressure sensing device 114 in the evaporator 102.

Coolant is supplied to the evaporator 102 through a temperature controlled coolant flow metering device 118 and is distributed within the evaporator through a series of orifices in distribution lines 120. For the purpose of sending the proper response to the flow metering device 106, a temperature sensing unit 122 is provided at the heat source 104. A second pressure sensing device 124 is provided at the outer surface of the vehicle 1 for controlling the coolant selector valve 88 in the same manner as was described in conjunction with the modification of Fig. 4.

It will be seen then that the cooling system of Fig. 5 will cool the heat load 122 at altitudes below 38,000 feet by vaporization of Freon, since the selector valve will pass only Freon at ambient pressures greater than 3 p.s.i. When the aerial vehicle 1 carrying this cooling system ascends to approximately 38,000 feet, the pressure sensing device 124 causes a signal to be sent to the selector valve 88 to switch the coolant flow from Freon to water. As the vehicle 1 ascends above 38,000 feet, the other pressure sensing device 114 senses the falling off of pressure below 3 p.s.i. and causes the motor 112 to move the louvers 110 in a direction which will tend to restrict the opening 108. In this manner, the evaporator pressure is prevented from falling below 3 p.s.i. so that vaporization of the water is effected at a fairly constant pressure thereby cooling the heat load 122 to a substantially stable temperature.

Obviously many modifications and variations of the present invention are possible in the light of the above teachings. It is therefore to be understood that within the scope of the appended claims the invention may be practiced otherwise than as specifically described.

What is claimed is:

1. In combination with an aerial vehicle carrying electronic components, a cooling system for said electronic components, comprising, a supply of liquid coolant, means for applying pressure to said coolant, a chassis assembly on which said electronic components are mounted, coolant passages in said chassis assembly, said passages being closed to prevent contact of said coolant with said electronic component, means for venting said passages to the atmosphere, and means for conveying said coolant to said passages, whereby at high altitudes, heat generated by said electronic components causes boiling of said coolant at lowered temperatures to cool said electronic components.

2. The combination as recited in claim 1, wherein said supply of coolant includes a reservoir of water.

3. The combination as recited in claim 1, wherein said coolant is water and said means for applying pressure includes a tank of pressurized nitrogen and a pressure regulating valve.

4. In combination with an aerial vehicle carrying electronic components, an evaporative cooling system for said electronic components, comprising, a reservoir of water, a tank of pressurized nitrogen coupled to said reservoir through a pressure regulator, a chassis assembly for mounting said electronic components in said aerial vehicle, coolant passages in said chassis assembly, said passages being vented to the atmosphere, and means for conveying water from said reservoir to said passages, said means including a fixed throttling orifice, whereby heat from said electronic components causes vaporization of the water in said passages at such temperatures as to cool said electronic components when said vehicle is in the higher altitudes.

5. The combination as recited in claim 4 with additionally a bypass valve paralleling said throttling orifice to permit a greater quantity of water to be circulated through said passages for cooling by transfer of sensible heat at low altitudes.

6. In an aerial vehicle, said vehicle having a heat load, an evaporative cooling system for removing heat from said heat load, comprising, a first and a second coolant supply, said first coolant having a lower vaporization temperature than said second coolant, a chassis on which said heat load is mounted, coolant passages in said chassis, an exhaust line for venting said passages to ambient pressures, means for conveying said first and second coolants to said coolant passages, means for selectively permitting one or the other of said coolants to flow within said passages, whereby cooling of said heat load is accomplished at lower altitudes by vaporization of said first coolant, and at higher altitudes by vaporization of said second coolant.

7. The system as recited in claim 6, wherein said conveying means includes a pressure source for applying pressure to each of said coolants, and means for controlling the rate of flow of either of said coolants.

8. The system as recited in claim 6, wherein said first coolant supply includes a reservoir of Freon, and said second coolant supply includes a reservoir of water.

9. The system as recited in claim 6, wherein said means for selectively permitting one or the other of said coolants to flow includes means responsive to ambient pressures.

10. In an aerial vehicle, said vehicle having a heat load; an evaporative cooling system for removing heat from said heat load, comprising, a plurality of chassis assemblies on which said heat load is mounted, coolant passages in each of said chassis assemblies, an exhaust line coupled to said chassis assemblies for venting said passages to ambient pressures, a pressure sensing device for sensing ambient pressures, a supply of water, a supply of Freon, a reservoir of pressurized gas coupled to said water and Freon supplies for exerting pressure thereon, coolant connections for conveying said water and Freon to each of said chassis assemblies, and coolant flow regulating means in said connections, said regulating means including a fixed throttling orifice for each of said chassis assemblies and a coolant selector valve for selectively permitting flow of either water or Freon to each of said chassis assemblies, said selector valve being responsive to ambient pressure as detected by said pressure sensing device, whereby said heat load is cooled at low altitudes by the vaporization of said Freon, and at high altitudes by the vaporization of said water.

11. The cooling system as recited in claim 10 with additionally a bypass valve across each of said throttling orifices, and means including an external source of a third coolant and a supply line between said external source and said passages to permit circulation of said third coolant in said passages for ground cooling of said heat load.

12. In an aerial vehicle, said vehicle having a heat load, an evaporative cooling system for removing heat from said heat load, comprising, a first and second coolant supply, said first coolant having a lower vaporization temperature than said second coolant, an evaporator in which said heat load is enclosed, coolant distribution means in said evaporator, means for venting said evaporator to ambient pressures and including means for maintaining a minimum pressure within said evaporator, means for conveying said first and second coolants to said coolant distribution means, said conveying means including flow metering means and means for selectively permitting one or the other of said coolants to flow therethrough, whereby cooling of said heat load is accomplished at lower altitudes by vaporization of said first coolant, and at higher altitudes by vaporization of said second coolant, the vaporization temperature of said second coolant remaining substantially stable due to the maintenance of a minimum evaporator pressure, thereby effectively cooling said heat load to a stabilized temperature.

13. The system as recited in claim 12, wherein said conveying means includes a source of pressurized gas and pressure regulating means for applying pressure to said first and second coolant.

14. The system as recited in claim 12, wherein said flow metering means includes a temperature sensing unit in said evaporator and a metering valve responsive to signals from said temperature sensing unit.

15. The system as recited in claim 12, wherein said means for selectively permitting flow of one or the other of said coolants includes a pressure sensing device for sensing ambient pressures and a selector valve responsive to signals from said pressure sensing device.

16. The system as recited in claim 12, wherein said venting means includes a variable exhaust opening.

17. The system as recited in claim 16, wherein said means for maintaining a minimum evaporator pressure includes a second pressure sensing device in said evaporator, and means responsive to said second pressure sensing device for varying said exhaust opening.

18. In an aerial vehicle, said vehicle having a heat load, an evaporative cooling system for removing heat from said heat load, comprising, an evaporator in which said heat load is enclosed, said evaporator having a first pressure sensing device therein, a temperature sensing device at said heat load, and coolant distributing means; said evaporator also having a variable exhaust opening for venting said evaporator to ambient pressures; means for varying said exhaust opening to regulate the pressure in said evaporator and controllable by a response to said first pressure sensing device; a second pressure sensing device for sensing ambient pressures; a supply of water; a supply of Freon; a reservoir of pressurized gas coupled to said water and Freon supplies for exerting pressure thereon; and means for conveying said water and Freon to said coolant distributing means in said evaporator and including coolant flow regulating means, said regulating means including a metering device and a coolant selector valve for permitting flow of either water or Freon, said metering device being responsive to said temperature sensing device at said heat load, said selector valve being responsive to said second pressure sensing device; whereby, cooling of said heat load at low altitudes is accomplished by vaporization of said Freon, and at high altitudes by vaporization of said water, the vaporization temperature of said water remaining substantially stable due to the regulation of presure within said evaporator, thereby effectively maintaining said heat load at a lowered stabilized temperature.

References Cited in the file of this patent

UNITED STATES PATENTS

| | | | |
|---|---|---|---|
| 552,481 | Kreusler | Dec. 31, 1895 |
| 1,791,964 | Kleinhans et al. | Feb. 10, 1931 |
| 2,304,151 | Crawford | Dec. 8, 1942 |
| 2,561,633 | Palmatier | July 24, 1951 |
| 2,566,301 | Albert | Sept. 4, 1951 |
| 2,610,472 | Maxwell | Sept. 16, 1952 |
| 2,831,329 | Morrison | Apr. 22, 1958 |